June 13, 1939.  L. J. NICKELS  2,162,112
ELECTRIC WELDING ELECTRODE HOLDER
Filed April 9, 1937  2 Sheets-Sheet 1
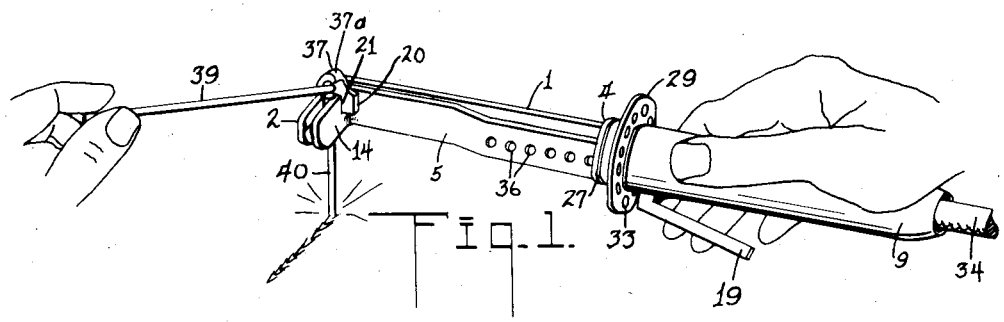
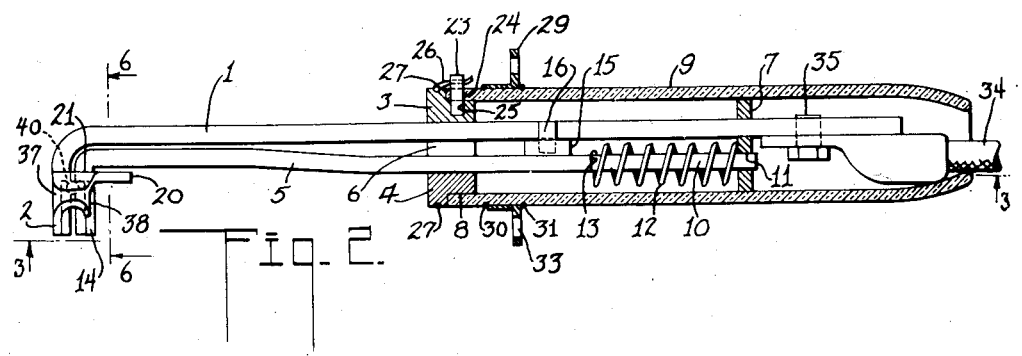
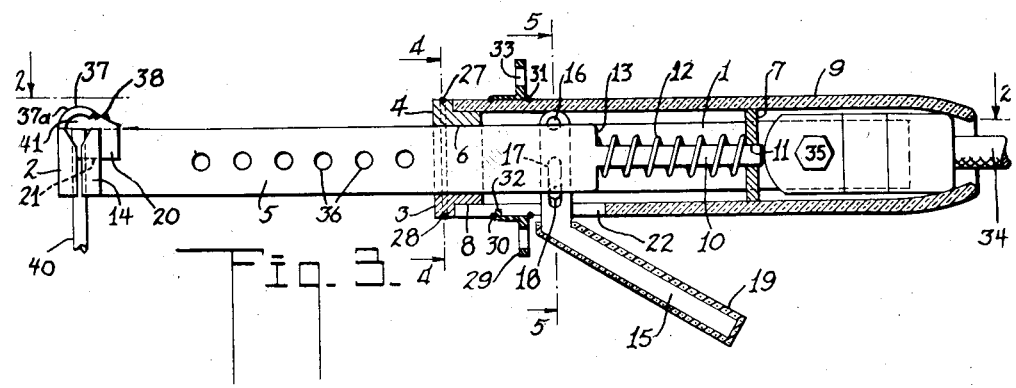
INVENTOR.
LESLIE J. NICKELS
BY
ATTORNEYS.

June 13, 1939.  L. J. NICKELS  2,162,112
ELECTRIC WELDING ELECTRODE HOLDER
Filed April 9, 1937  2 Sheets-Sheet 2

INVENTOR.
LESLIE J. NICKELS
BY Munn, Anderson + Liddy
ATTORNEYS.

Patented June 13, 1939

2,162,112

UNITED STATES PATENT OFFICE 2,162,112

ELECTRIC WELDING ELECTRODE HOLDER

Leslie J. Nickels, Arbuckle, Calif.

Application April 9, 1937, Serial No. 135,943

9 Claims. (Cl. 219—8)

My invention relates to improvements in an electric welding electrode holder, and it consists of the combinations, constructions and arrangements hereinafter described and claimed.

An object of my invention is to provide an electric welding electrode holder in which the jaws for holding the electrode are so shaped that they will permit a new electrode to be inserted between the jaws and the insertion of the new electrode will force out the old electrode. The holder is designed to permit this operation to be performed by a welder without the necessity of the welder removing a shield from his face. I provide a socket on one of the jaws for receiving an end of the new electrode while the old electrode is still arcing, and this socket is so positioned with respect to both jaws that it will act as a guide in conveying the new electrode down into the proper position between the jaws. The entire holder has been designed with a viewpoint of permitting the welder to move his hands in a natural manner when changing electrodes. The used electrode or stub is white hot and can be seen through the dark glass. The new rod can be slipped into position before the weld has cooled appreciably. This permits the welder to see the spot to start welding with the new electrode and the change can be so rapidly done that welding can be recommenced before the bead has had time to cool.

The device is simple in construction and the various parts may be quickly disassembled by hand and again reassembled without the need of any tools. The two jaws extend from a casing made of insulating material. One of the jaws is fixed and the other is movable. A lever projects from the casing and is operatively connected to the movable jaw to permit a welder to actuate the lever with the fingers of the same hand that supports the holder for freeing a used electrode at the time a new electrode is being substituted. This leaves the other hand free to insert the new electrode.

The socket that receives the new electrode is so designed that the electrode may be fulcrumed against one edge of the socket when it is desired to use the electrode as a prying tool for forcing the used electrode that has become fused or otherwise stuck in the grooves, from the jaws. The socket further has a portion that acts as a guide for the movable jaw.

Other objects and advantages will appear in the following specification, and the novel features of the device will be particularly pointed out in the appended claims.

My invention is illustrated in the accompanying drawings forming a part of this application, in which Figure 1 is a perspective view of the holder illustrating its use when a welder substitutes a new electrode for a used one;

Figure 2 is a section substantially along the line 2—2 of Figure 3;

Figure 3 is a section substantially along the line 3—3 of Figure 2;

Figure 4:
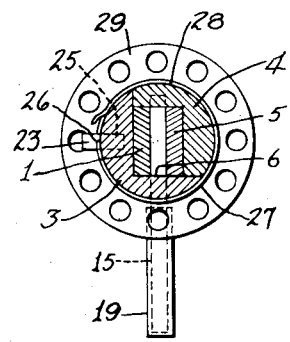
Figure 4 is a section along the line 4—4 of Figure 3.

In carrying out my invention I provide a stationary bar 1 that has a jaw 2 integral therewith and extending at right-angles thereto, see Figure 2. The bar carries a part 3 of a bushing of the shape shown in Figures 2 and 4. This bushing part is preferably welded to the bar and a complemental portion 4 is removably secured to the part 3. The two parts provide an opening for permitting a movable bar 5 to be disposed parallel with the stationary bar 1, and to be slidably received in the opening. The opening 6 in the bushing 3 is wide enough to permit the bars 1 and 5 to be spaced apart for a purpose hereinafter described.

Near the rear end of the stationary bar 1, I mount a disc 7 and this disc is preferably welded to the bar. The bushing 3 has a reduced cylindrical portion 8 of the same diameter as the disc 7. A handle 9 made of insulating material is mounted on the disc 7 and on the reduced portion 8.

Figure 5:
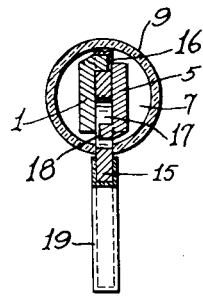
Figure 5 is a section along the line 5—5 of Figure 3.

Figure 3 shows the movable bar 5 provided with a reduced portion 10 and this portion is slidably received in an opening 11 in the disc 7. A spring 12 is mounted on the reduced portion 10 and bears against the disc 7 and against a shoulder 13 on the bar 5 for moving a jaw 14 integral with the bar 5 toward the jaw 2. The means for moving the jaw 14 away from the jaw 2 consists of a lever 15 pivoted to a pin 16 that is integral with the bar 1, see Figure 5. The lever has a slot 17 that slidably receives a pin 18 integral with the bar 5. The handle portion of the lever 15 is covered with a sleeve 19 of insulating material and when this handle portion is moved toward the casing 9, the wall of the slot 17 will move the pin 18 rearwardly against the compression of the spring 12 and this will move the jaw 14 away from the jaw 2.

Figure 2 shows the lever 15 extending up between the bars 1 and 5 and the bars are spaced apart for this purpose. The jaw 14 is guided in its movement by a guide member 20 that is integral with the jaw 2 and is received in a slot 21 in the jaw 14. The casing 9 has a slot 22 for receiving the lever 15 and this permits the casing 9 to be moved over the rear portion of the bars 1 and 5 after the bars have been assembled. A pin 23 is inserted through an opening 24 in the casing 9 and is received in a bore 25 in the bushing 3. This pin secures the casing to the bushing. The pin in turn is held against removal by an end 26 of a split spring 27, this spring being received in an annular groove 28 formed in the parts 3 and 4 of the bushing. The spring 27 therefore not only holds the pin 23 in place but also holds the removable part 4 of the bushing in place.

A slip-on guard 29 is mounted on the casing 9 and is held against longitudinal movement on the casing by split springs 30 and 31. The guard 29 carries a projection 32 that is received in the slot 22 for preventing rotation of the guard on the casing. The guard may be perforated at 33 for cooling purposes if desired. The rear end of the bar 1 is connected to an electric cable 34 by means of a screw 35 or other suitable fastening means. The bar 5 may be perforated at 36 in order to keep the bar cool.

One of the principal features of my invention is a socket or guide indicated generally at 37 for guiding the new electrode between the jaws. The socket is formed integral with the guide 20. The socket 37 is in the shape of a housing with a curved top 37a, this curved top extending from the jaw 2. The curved top 37a has an edge 38 that is spaced above the upper edge of the jaw 14 a distance which will permit a new electrode 39, see Figure 1, to be inserted between the edge 38 and the top edge of the jaw 14. The operator may then swing the new electrode 39 until it lies in a plane that extends between the jaws 2 and 14 and is parallel therewith. Figure 1 shows the new electrode 39 in this position.

Figure 6:
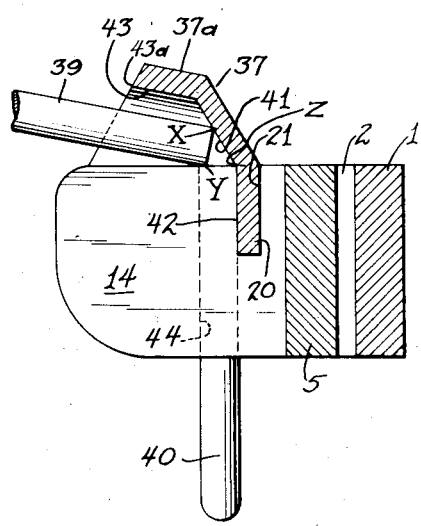
Figure 6 is an enlarged section along the line 6—6 of Figure 2.
Figure 7:
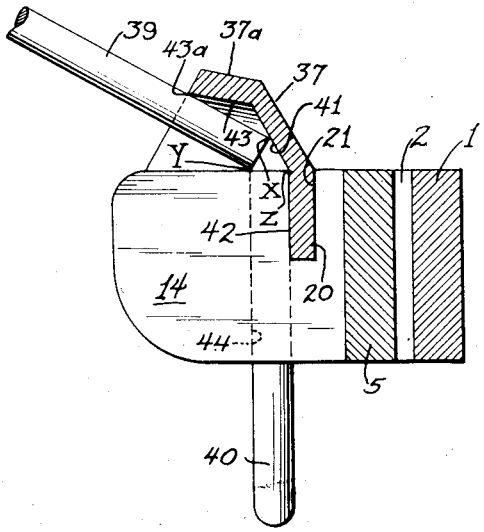
Figure 7 is a section similar to Figure 6.

In Figures 6 and 7 I show a longitudinal section through the socket 37 on an enlarged scale. Figure 6 illustrates how the new electrode 39 may be inserted in the socket 37 and then rocked into place between the jaws 2 and 14, this movement expelling a used electrode 40. The socket 37 has an inclined wall 41 extending upwardly from the guide 20. The face 42 of the guide acts as a rest for the old electrode 40. The inclined portion 41 extends substantially at an angle of 60° to a line that is perpendicular to the face 42, and coinciding with the upper edge of the jaw 14. The curved top 37a of the housing or socket has its under surfaces 43 extending substantially at an angle of 10° to a plane that is parallel with the tops of the jaws.

From the foregoing description of the various parts of the device, the operation thereof may be readily understood.

Let us assume that the electrode 40 has been used down to a point where it is necessary to substitute a new electrode for the used one. In welding, the arcing rod is usually held at an angle of about 45° to the work. This will position the socket where it can readily receive the new rod. The welder in substituting the new rod for the used rod, breaks the arc and moves the holder two or three inches nearer himself while pressing the lever for releasing the old rod. The socket is in the right position to receive the end of the new rod and the old rod will furnish sufficient light for the welder to see the socket without removing his helmet. The corner X of the new electrode is placed against the surface 41 and the corner Y is placed against the top of the used electrode 40. The welder holds the electrode 39 immovable and swings the entire holder about the point X as a fulcrum, see Fig. 6. The wrist is turned for rotating the handle 9 on its axis during this movement. The used electrode falls freely from the jaws as it is forced out by the cam action of the new electrode fulcruming on the point X, and the swinging of the holder is continued until the lever 15 and jaws point toward the operator and the point Y contacts with a point Z that is the juncture between the surfaces 41 and 42. Point Y now becomes the fulcrum for the new electrode as the handle 9 continues to rotate on its axis and this point rocks on the point Z until the new electrode takes the position formerly occupied by the used electrode. The new electrode is now pressed firmly against the face 42 and it will be in alignment with grooves 44 in the jaws. The lever 15 is released and the jaws will grip the new electrode.

The entire holder is also designed for economy in movement when changing electrodes. During the changing of electrodes the entire tool is moved to the right in Figure 1 in order to bring the end of the new electrode above the material being welded. This operation not only saves time and relieves the fatigue of the operator, but it permits the actual welding to be instantly resumed and the welder can see the spot to start welding because the old weld has not had a chance to cool. Furthermore, the old weld will not become porous due to the excessive contraction when too long a time elapses due to the changing of electrodes under the old way.

Where the old electrode has become partly fused or sticks between the jaws, the new electrode may be used as a prying tool in a manner shown in Figure 7. While the jaw 14 is being held away from the jaw 2, the new electrode may be inserted in the socket 37 and brought against the top of the electrode 40. The new electrode may now be fulcrumed about an edge 43a of the surface 43 in such a manner as to drive the inner end of the new electrode down upon the top of the old electrode and to pry it from the groove 44 in which it is stuck. This action will eject the used electrode and then the new electrode may be quickly moved into place in the manner already indicated.

The welder strikes an arc with the new electrode by scraping the electrode on the material to be welded a short distance from where the actual welding is to commence. The holder is moved away from the operator during this movement and this avoids forcing the new electrode up into the socket or guide 37 and interfering with the insertion of the next electrode. From actual experience with the welder, I have found that when exchanging rods or electrodes one can see the stub fall because it is still white hot when discharged two or three inches from the weld.

Under the old method, the welder must raise his helmet when freeing the old rod, then insert a new one in the holder, then lower his helmet and find the end of the bead which has had a chance to cool causing a shrinking and pitting of the metal. Normally in welding, time must be taken to clean the bead of oxide or to remove the covering of slag when a shielded rod is used and the rods are being changed, but with the present holder, the change is made so quickly that this operation is not necessary. The helmet shields the welder's eyes during the entire rod changing operation.

The holder can be used in the same manner as standard holders. The spring for operating the movable jaw is spaced away from the arc and is shielded to keep it cool. The lever 15 is covered with an insulating material for protection and to keep the fingers from slipping. There is ample clearance between the bars 1 and 5 and the jaws 2 and 14 to allow for and relieve the clogging action of rod spatter. The separation of the bars between the jaws and the casing will aid in keeping the device cool.

The lever 15 serves a double function. It not only is actuated for moving the jaw 14 away from the jaw 2, but it also can be pressed outward, away from the casing 9 to add pressure to the jaw 14 above that exerted by the spring 12. This movement is resorted to when it is desired to grip the electrode more firmly should it stick to the weld which sometimes happens. The lever is pressed with the back of the fingers when holding the jaws together.

While I have shown only the preferred form of my invention, it should be understood that various changes or modifications may be made within the scope of the appended claims without departing from the spirit of the invention.

I claim:

1. In combination, a stationary jaw, a movable jaw, a guide for the movable jaw and being carried by the stationary jaw, said guide carrying a housing for receiving the end of an electrode, the housing positioning the electrode end between the two jaws, whereby the operator can rock the electrode between the jaws when the jaws are separated, and means for actuating the movable jaw.

2. In combination, a pair of jaws, one of the jaws having a slot therein, a guide member carried by the other jaw and slidably receivable in the slot, and a socket integral with the guide member and lying in a plane that passes between the jaws.

3. In combination, a pair of jaws, one of the jaws having a slot therein, a guide member carried by the other jaw and slidably receivable in the slot, and a socket integral with the guide member and lying in a plane that passes between the jaws, said socket having an inner wall portion extending at an angle to the guide member, and a second wall portion extending at a slight angle to a plane paralleling the tops of the jaws.

4. In combination, a stationary bar, a movable bar disposed parallel to the stationary bar, a jaw carried by each bar and extending at an angle thereto, one of said jaws having a slot therein, a guide carried by the other jaw and being receivable in the slot, a second guide carried by the stationary bar and slidably receiving the movable bar, a spring for actuating the movable bar for yieldingly holding the movable jaw against the fixed jaw, and a lever pivoted to the fixed bar and operatively connected to the movable bar for moving the movable jaw away from the fixed jaw.

5. In combination, a stationary bar, a movable bar disposed parallel to the stationary bar, a jaw carried by each bar and extending at an angle thereto, one of said jaws having a slot therein, a guide carried by the other jaw and being receivable in the slot, a second guide carried by the stationary bar and slidably receiving the movable bar, a spring for actuating the movable bar for yieldingly holding the movable jaw against the fixed jaw, and a lever pivoted to the fixed bar and operatively connected to the movable bar for moving the movable jaw away from the fixed jaw, a support for a casing carried by the fixed bar, and an insulating casing mounted on the second guide and the casing support for enclosing the spring and the rear portions of the bars, said casing having a slot through which the lever extends.

6. In combination, a pair of jaws, one of said jaws having a slot therein, a guide plate carried by the other jaw and being slidably received in the slot, said jaws having complementary electrode receiving grooves arranged so that an electrode will be received in the grooves when the electrode contacts with the guide, and a socket integral with the guide for receiving an end of an electrode, said socket acting as a fulcrum point for the electrode as it is swung into a position between the jaws.

7. In an electrode holder, electrode gripping jaws, a fulcrum member lying in a plane that extends between the jaws and provided with a socket that has a slot paralleling the lengths of the jaws and an opening facing in the direction of the open ends of the jaws.

8. In combination, a pair of jaws, a socket lying in a plane that passes between the jaws, said socket having an inner wall portion extending at an angle to the length of the jaws, and a second wall portion extending at a slight angle to a plane paralleling the tops of the jaws.

9. In combination, a casing, two bars extending from the casing in the direction of its length, each bar carrying a jaw that extends at an angle to the bar, means for operating the jaws for gripping an electrode therebetween, and a socket disposed at the tops of the jaws and lying in a plane that passes between the jaws, said socket having an opening facing in the direction of the open ends of the jaws, said socket being adapted to terminally engage an electrode and about which the electrode may be rocked and moved between the opened jaws when the casing is manually rotated about its axis.

LESLIE J. NICKELS.